(12) United States Patent
Custer et al.

(10) Patent No.: US 9,096,734 B2
(45) Date of Patent: Aug. 4, 2015

(54) PREPREG WITH INTEGRATED MULTI-DIMENSIONAL GAS VENTING NETWORK

(75) Inventors: Milton Custer, Dublin, CA (US); George Green, Dublin, CA (US); W. Mark Bielawski, Dublin, CA (US)

(73) Assignee: Hexcel Corporation, Dublin, CA (US)

( * ) Notice: Subject to any disclaimer, the term of this patent is extended or adjusted under 35 U.S.C. 154(b) by 924 days.

(21) Appl. No.: 12/358,302

(22) Filed: Jan. 23, 2009

(65) Prior Publication Data

US 2010/0189988 A1 Jul. 29, 2010

(51) Int. Cl.
*C08J 5/24* (2006.01)
*B29B 15/10* (2006.01)

(52) U.S. Cl.
CPC .. *C08J 5/24* (2013.01); *B29B 15/10* (2013.01); *Y10T 428/249953* (2015.04)

(58) Field of Classification Search
CPC ............ C08J 5/24; B29B 15/08; B29B 15/10; Y10T 428/249953
USPC ............ 428/304.4, 912; 442/64, 65, 76, 281, 442/286, 394
See application file for complete search history.

(56) References Cited

U.S. PATENT DOCUMENTS 5,104,718 A * 4/1992 Asada et al. .................. 428/167
2004/0142143 A1* 7/2004 Corden et al. ................ 428/103
2004/0146696 A1* 7/2004 Jones ........................... 428/167
2004/0230008 A1* 11/2004 Correll et al. .............. 525/326.2
2010/0203787 A1* 8/2010 Steele et al. .................. 442/181

FOREIGN PATENT DOCUMENTS

| DE | 19810312 | 10/1999 |
|---|---|---|
| EP | 01128958 B1 | 3/2005 |
| EP | 1379376 B1 | 12/2005 |
| EP | 1144190 B2 | 9/2008 |
| EP | 1880819 B1 | 8/2009 |
| WO | 91/15538 | 10/1991 |
| WO | WO 02/088231 A1 | 11/2002 |
| WO | WO 02/090089 A1 | 11/2002 |
| WO | 2007/010573 | 1/2007 |
| WO | 2007/110617 | 10/2007 |
| WO | 2008/127556 | 10/2008 |
| WO | 2008/130484 | 10/2008 |

OTHER PUBLICATIONS

Milton Custer, Laminating Materials, ip.com 000031233D.

* cited by examiner

*Primary Examiner* — Jeremy R Pierce
(74) *Attorney, Agent, or Firm* — W. Mark Bielawski; David J. Oldenkamp

(57) ABSTRACT

Composite prepreg including a gas venting network that allows multi-dimensional escape of gas from the prepreg during the curing process. Penetrable barriers are also provided between the matrix precursor elements to promote long-term storability of the prepreg at ambient temperatures. All or a portion of the gas venting network may be integrated with the penetrable barriers.

11 Claims, 1 Drawing Sheet

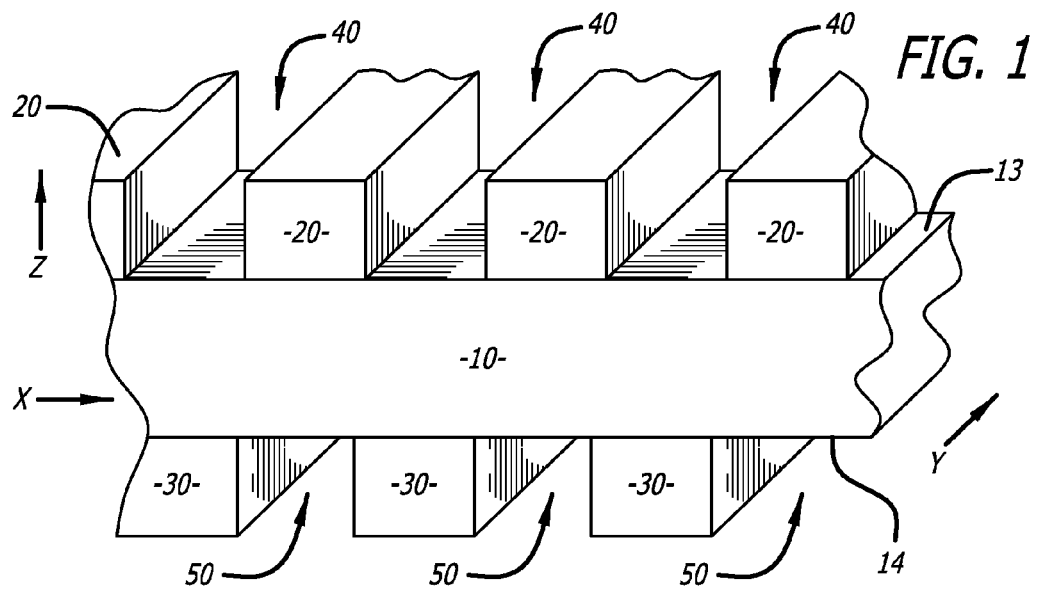
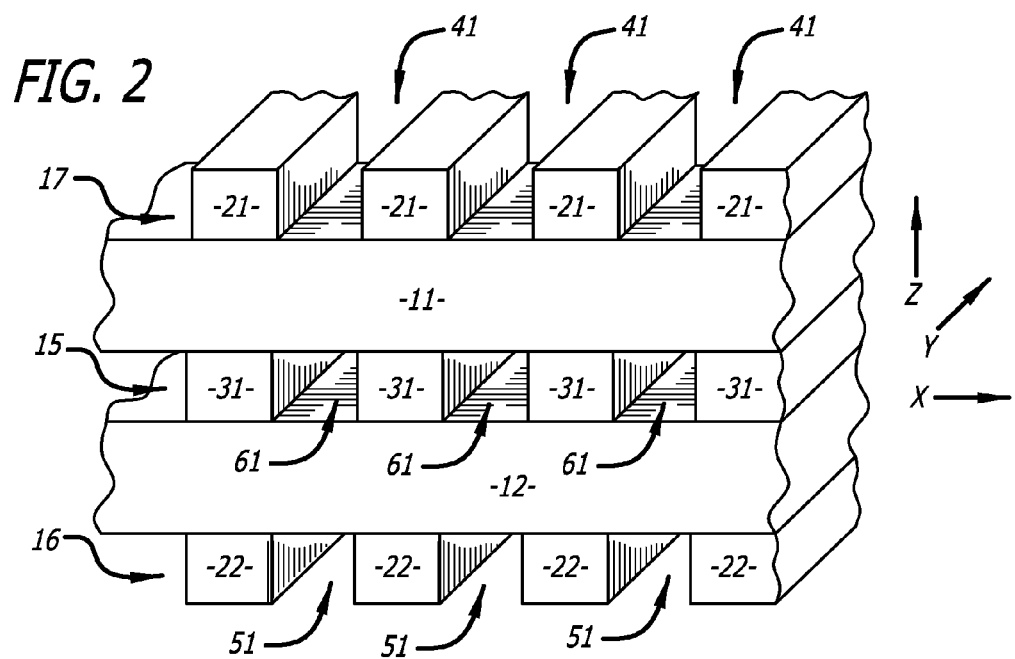
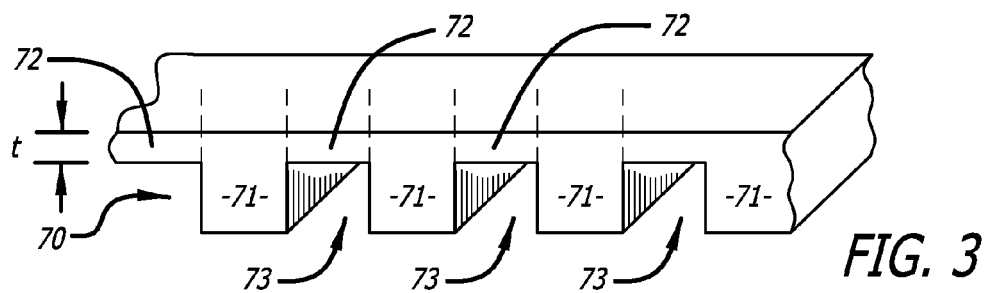

PREPREG WITH INTEGRATED MULTI-DIMENSIONAL GAS VENTING NETWORK

BACKGROUND OF THE INVENTION

1. Field of the Invention

The present invention relates generally to the field of composite materials and more specifically to prepreg and laminates made from prepreg that are molded into a wide variety of composite parts. More particularly, the present invention is directed to improving the shelf-life or storability of prepreg, while at the same time reducing the amount and size of voids that form in the composite part during molding operations.

2. Description of Related Art

Composite materials are typically composed of a resin matrix and reinforcing fibers as the two primary constituents. Composite materials are used extensively in the aerospace industry and in other situations where high strength and light weight are desired. Although a wide variety of matrix resins have been used, thermosetting resins, such as epoxy and bismaleimide resins, are particularly popular for aerospace applications. A wide range of fiber types have also been used in aerospace composites. Glass, graphite, carbon and ceramic fiber are common. The fibers can be chopped, randomly oriented, unidirectional in orientation or woven into fabric. The fibers used in composite materials have diameters that range from extremely small to relatively large. Although it is possible to make composites using large diameter fibers, the more common practice is to take thousands of fibers having extremely small diameters and form them into individual bundles known as tows. These multi-fiber tows are much stronger and more flexible than single fibers having the same overall diameter. The tows can be woven into fabric in the same manner as conventional yarns. Alternatively, the tows are arranged in parallel to provide a unidirectional fiber orientation or they can be randomly oriented.

There are a number of ways to combine the resin with the fibers to form the final composite material. One approach, which has been in use for years, is to manually impregnate the fibers with activated resin in-situ on a mold or other support structure. Heat is then used to cure the resulting "lay-up". This type of manual lay-up procedure is popular because it is simple and requires little, if any special tools. However, it is difficult to accurately control the amount of resin that is applied to the fibers and to insure that the resin is being uniformly impregnated into the fiber tows. In addition, the amounts of curing agent and other additives that are included in the resin may vary between lay-ups. As a result, manual impregnation methods are not typically used in aerospace applications where the combination of high strength and light weight is an important design consideration.

In order to avoid the above problems, it has been common practice to form a prefabricated lay-up (prepreg) that includes the fiber and a resin matrix (resin, curing agents and any additives). The prepreg is made under manufacturing conditions that allow the amount and distribution of resin matrix within the prepreg to be carefully controlled. Once formed, the prepreg may be applied to a mold or other support surface in the same manner as a conventional hand lay-up. In general, prepregs are not used immediately after they are formed. Instead, they usually are stored for use at a later time.

There are a number of characteristics that are desirable in any prepreg. For example, the prepreg must be sufficiently flexible to allow application to the desired mold surface. In addition, the tackiness (or tack) of the prepreg must be such that the prepreg adheres to underlying prepreg layers in the mold while not being so sticky that it becomes disrupted when handled. The prepreg resin should remain stable during storage so that the handling characteristics (i.e. flexibility and tack) do not change. In addition, the resin should not flow away from the fibers or otherwise redistribute itself undesirably during storage. At the same time, the resin should have appropriate flow characteristics during cure to provide good laminate quality.

The stability of prepreg during storage has been, and continues to be, one of the more problematic areas of prepreg manufacture and use. It has been common practice to refrigerate the prepreg during storage and transport to keep reactions between the resin and curative agents to a minimum. However, such refrigeration can be expensive and time consuming. Accordingly, there is a continuing need to provide prepreg systems that are designed to be less dependent on the storage temperature. The goal being to provide prepreg that is designed such that it can be stored and transported at ambient temperatures.

Another area that has been a source of problems for prepreg is the formation of pores in the final laminate. Gas generated during the curing process can become trapped within the laminate where it forms pores or voids that reduce the strength of the final part. There is a continuing need to develop prepreg systems that are designed to vent gas from the prepreg during the curing process to thereby eliminate the formation of undesirable pores.

SUMMARY OF THE INVENTION

In accordance with the present invention, prepreg are provided that include gas venting networks that allow multi-dimensional escape of gas from the prepreg during the curing process. In addition, penetrable barriers are provided that enhance the long-term storability of the prepreg at ambient temperature.

The present invention is based on combining a fibrous element with one or more matrix precursor elements in a variety of ways to provide for multi-dimensional venting of gas when the prepreg is heated to curing temperatures. The matrix precursor elements may be resin elements, curative elements or fully formulated elements that include both the resin and curative. In accordance with the present invention, these matrix precursor elements are oriented relative to each other and to the fibrous element in specified configurations that form multi-dimensional gas venting networks. The gas venting networks, which may be formed prior to or during the curing process, provide for efficient multi-dimensional escape of gas from the prepreg during curing thereof.

As a feature of the present invention, penetrable barriers are provided that form barrier zones between the matrix precursor elements during storage at ambient temperature. In some embodiments of the invention, the matrix precursor elements remain in a non-flow state during storage and they transition to a flow state during curing of the prepreg. In the flow state, the matrix precursor elements flow into the barrier zones to form the final cured composite. As a further feature, the gas venting network may be integrated together with the barrier zones.

The prepreg in accordance with the present invention is well-suited for long-term storage at ambient temperatures. In addition, the multi-dimensional gas venting system that is formed by the various matrix precursor elements and penetrable barriers provides efficient removal of gas during the curing process to thereby reduce the formation of pores in the cured laminate.

The above described and many other features and attendant advantages of the present invention will become better understood by reference to the following detailed description when taken in conjunction with the accompanying drawings.

BRIEF DESCRIPTION OF THE DRAWINGS

FIG. 1 is a simplified representation of a single-ply generic exemplary prepreg in accordance with the present invention.

FIG. 2 is a simplified representation of a multiple-ply generic exemplary prepreg in accordance with the present invention.

FIG. 3 is a simplified representation of a sheet or layer of resin matrix precursor elements in accordance with the present invention.

DETAILED DESCRIPTION OF THE INVENTION

An exemplary single layer prepreg in accordance with the present invention is shown in simplified form in FIG. 1. The exemplary prepreg includes a fibrous element 10 and matrix precursor elements 20 located on the top side 13 of the fibrous element 10 and matrix precursor elements 30 located on the bottom side 14 of the fibrous element 10. Barrier zones 40 are located between the matrix precursor elements 20 and barrier zones 50 are located between the matrix precursor elements 30. The barrier zones 40 and 50 may also used to form a multi-dimensional network of gas venting zones in accordance with the present invention. In the preferred embodiments, substantially all of the gas venting zones are integrated with the barrier zones 40 and 50.

An exemplary two layer prepreg in accordance with the present invention is shown in simplified form in FIG. 2. The exemplary prepreg includes two fibrous elements 11 and 12. There is a central zone 15 located between the fibrous elements 11 and 12. Exterior zones 16 and 17 located on opposite sides of the prepreg. The two layer prepreg includes matrix precursor elements 31 located in the central zone 15 and matrix precursor elements 21 and 22 located in the exterior zones 17 and 16, respectively. Barrier zones 41, 51 and 61 are located between the matrix precursor elements 21, 22 and 31, respectively. The barrier zones 41, 51 and 61 are also used to form a multi-dimensional network of gas venting zones in accordance with the present invention. In the preferred embodiments, substantially all of the gas venting zones are integrated with the barrier zones 41, 51 and 61.

The fibrous layers 10, 11 and 12 may include any of the fibrous materials that are typically used in prepreg for making composite materials. The fibrous material may be selected from hybrid or mixed fiber systems that comprise synthetic or natural fibers, or a combination thereof. The fibrous reinforcement may preferably be selected from any suitable material such as glass, carbon, ceramic or aramid (aromatic polyamide) fibers. The fibrous material is preferably carbon fibers.

The fibrous material may comprise cracked (i.e. stretch-broken) or selectively discontinuous fibers, or continuous fibers. The use of cracked or selectively discontinuous fibers may facilitate lay-up of the prepeg and improve its capability of being shaped. The fibrous material may be in a woven, non-crimped, non-woven, unidirectional, or multi-axial textile structure. The woven form may be selected from a plain, satin, or twill weave style. The non-crimped and multi-axial forms may have a number of fiber orientations. Such styles and forms are well known in the composite reinforcement field, and are commercially available from a number of companies, including Hexcel Reinforcements (Villeurbanne, France).

The fibrous material 10, 11 and 12 may be coated or impregnated with resin, curative and/or other prepreg ingredients, if desired. However, it is preferred that the fibrous material remain substantially free of such ingredients so that gas will flow through the fibrous material, during curing, in the same plane as the fibrous material (x and y directions as shown in FIGS. 1 and 2) and transversely through the fibrous material (z direction as shown in FIGS. 1 and 2). The fibrous material forms a part of the multi-dimensional gas venting network in accordance with the present invention. Accordingly, the amount of resin, curative and/or other ingredients that are impregnated into the fibrous material must be such that gas can still flow in the x, y and z directions through the fibrous materials 10, 11 and 12.

The matrix precursor elements 20, 30, 21, 22 and 31 are preferably in the form of straight parallel lines of material that extend laterally (y direction) across the fibrous material. The lines may be curved or sinuous provided that they remain separated by the barrier zones 40, 50, 41, 51 and 61, respectively, in order to allow flow of gas in the y direction. The lines of matrix precursor elements may be continuous or discontinuous in order to enhance gas flow. The lines of precursor elements may be oriented parallel to the y direction as shown in FIGS. 1 and 2 or they may be oriented at a variety of angles including ±90°, ±45°, ±30° and ±15°, with respect to the y direction The linear matrix precursor elements and barrier zones are shown as having relatively square cross-sections in FIGS. 1 and 2 for demonstrative purposes. The actual cross-sectional shape of the matrix precursor elements and barrier zones may be rectangular, rounded or a wide variety of other shapes. The cross-sectional size of the matrix precursor elements and barrier zones may be varied provided that the barrier zones between the matrix precursor elements, if any, are sufficiently large to provide adequate escape of gas through the multi-dimensional venting network during curing of the prepreg. The cross-sectional size may be uniform or non-uniform The matrix precursor elements may be composed of thermosetting resin (R), curatives (C) for the thermosetting resin or a mixture of thermosetting resin and curative for the thermosetting resin (M). The matrix precursor elements may be arranged in a variety of orientations in order to form a gas venting network that provides for escape of gas from the prepreg in the x, y and z directions as shown in FIGS. 1 and 2.

With regards to matrix precursor elements 20 and 30 shown in FIG. 1, exemplary orientations have the following general repeating patterns: 1-A) ROROROROROROROR; 1-B) COCOCOCOCOCOCOC 1-C) MOMOMOMOMOMO-MOM; 1-D) ROCOROCOROCOROC; 1-E) ROROCO-COROROCOC; 1-F) ROROROCOCOCOROROR; and 1-G) ROROROROCOCOCOC where O is the barrier zones or openings 40 and 50. One or more of the barrier zones or openings (O) may be eliminated from the above general patterns provided that there are sufficient openings remaining through the matrix precursor elements on one and/or both sides of the fibrous element to allow gas to escape from the prepreg in the x, y and z directions during curing. For example, the following general repeating patterns are suitable: 1-*a*) RRRRRRR; 1-*b*) CCCCCCC; 1-*c*) MMMMMMM; 1-*d*) RCRCRCRCRC; 1-*e*) RCRORCROR-CRO; 1-*f*) CCORROCCORRO; and 1-*g*) RCORCOR-CORCO;

The matrix precursor elements 20 and 30 may be lined up in the Z direction or they may be offset as shown in FIG. 1. In addition, the various repeating patterns of R, C, M and O may be varied between the matrix precursor elements 20 and 30. For example, the offset orientation of matrix precursor elements represented in FIG. 1, where elements 20 are thermosetting resin and elements 30 are curative, may be represented as follows: 1-*i*) 20=ROROROROR and 30=OCOCOCOC. If the matrix precursor elements are lined up in the Z direction, the orientation is represented as follows: 1-*ii*) 20=ROROROROR and 30=COCOCOCO.

Other exemplary orientations include the following: 1-1) 20=ROCOROCO and 30=COROCORO; 1-2) 20=ROCOROCO and 30=OROCOROC; 1-3) 20=MOMOMOMO and 30=OMOMOMOM; 1-4) 20=MOMOMOMO and 30=MOMOMOMO; 1-5) 20=ROROCOCOROR and 30=COCOROROCOC; 1-6) ROROCOCOROR and 30=OCOCOROROCO; 1-7) 20=ROROROCOCOCOROROR and 30=COCOCOROROROCOCOC; 1-8) 20=ROROROCOCOCOROROR and 30=OCOCOCOROROROCOCO; 1-9) 20=RRRRRRRR and 30=COCOCOC; 1-10) 20=CCCCCCC and 30=ROROROR; 1-11) 20=MMMMMMM and 30=MOMOMOMO; and 1-12) 20=RCRORCRORCR and 30=ROCOROCOROCO.

The prepreg shown in FIG. 1 may be stacked sequentially during lay up and laminate formation so that the matrix precursor elements 20 on one prepreg are located next to the matrix precursor elements 30 on other prepreg. Alternatively, the various layers of prepreg may be flipped so that the prepreg precursor elements 20 on one prepreg are located next to the matrix precursor elements 20 on the adjacent prepreg and the matrix prepreg precursor elements 30 are located next to the matrix precursor elements 30 on the adjacent prepreg. When laying up multiple layers of the prepreg shown in FIG. 1, the matrix precursor elements may be located relative to each other in a variety of orientations provided that a multi-dimensional (X, Y and Z directions) gas venting network is formed. If desired, the prepreg shown in FIG. 1 may be used to form a multiple layer prepreg that is stored for later use. Prepreg composed of two or three layers of single-ply material (FIG. 1) are preferred, with the layers being oriented in a sequential or flipped configuration.

An example of a sequentially stacked laminate is one where prepreg having the exemplary orientation (1-9), as set forth above, are stacked so that matrix precursor elements 20 are located next to matrix precursor elements 30 in the lay up. An example of a flipped lay up configuration is one where prepreg having the exemplary orientation (1-*ii*), as set forth above, are stacked so that the matrix precursor elements 20 are located next to matrix precursor elements 20 and the matrix precursor elements 30 are located next to the matrix precursor elements 30.

If desired, the matrix resin precursors 20 and 30 may be provided as two or more layers of material, instead of one layer as shown in FIG. 1. For example, matrix precursor elements composed of two layers (not shown) may be represented as 20*a* and 20*b* or 30*a* and 30*b*, where 20*a* and 30*a* are closest to the fibrous material. The two layers may be oriented so that the lines of matrix precursor elements are parallel to each and placed on top of each other. Alternatively, the parallel lines of matrix precursor elements may be offset relative to each other. In addition, the two layers of linear matrix precursor elements may be oriented at angles relative to each other, such as ±90° or ±45°, ±30° or ±15°.

As examples, the two layers of matrix resin precursor may be oriented as follows: 1-1D) 20*a* or 30*a*=RRRRRRRRR and 20*b* or 30*b*=ROROROROR; 1-2D) 20*a* or 30*a*=CCCCCCCC and 20*b* or 30*b*=COCOCOCO; 1-3D) 20*a* or 30*a*=RCRCRCRCRCR and 20*b* or 30*b*=RCORCORCORC; 1-4D) 20*a* or 30*a*=RCRCRCRCRC and 20*b* or 30*b*=RCRCRCRCRC. The matrix precursor elements may be arranged so that there is one layer on one side of the fibrous reinforcement 10 (e.g. 20 or 30) and two layers on the other side (e.g. 30*a*/30*b* or 20*a*/20*b*, respectively). An example is where 20*a*=RCRCRCRCRCR, 20*b*=RCORCORCORCO and 30=ROROROROROR. An example of matrix precursor elements having three layers are: 20*a*/30*a*=ROCOROCROC; 20*b*/30*b*=ROCOROCROC; and 20*c*/30*c*=ROCOROCROC. Matrix precursor elements may be formed from four our more layers of different material, however, it is preferred that the number of layers in each element be three or less for singleply prepreg of the type shown in FIG. 1.

When two or more layers are used, the orientation and amounts of materials must be chosen so that a multi-dimensional gas venting network is formed when the prepreg is heated during the curing process. Prepreg that includes two layers of matrix precursor elements on one side of the fibrous element may be stacked to form multi-ply laminates in a sequential or flipped configuration, as described above.

The barrier zones 40 and 50 (O) are formed by placing a penetrable barrier between the matrix precursor elements. The penetrable barrier may be made from a gas (preferably air or inert gas), or a thermo-fusible polymer or other solid barrier that melts, dissolves or is otherwise removed when the prepreg is heated during the curing process. Exemplary thermo-fusible materials are block copolymers, such as polyethylene oxide; plasticizers, such as phthalates; elastomers, such as styrene butadiene styrene; and thermoplastic polymers, such as thermoplastic urethanes. The thermofusible materials preferably have a glass transition temperature that is no less than 20° C. below the glass transition temperature or the thermosetting resin. The penetrable barrier may also be a porous material that is sufficiently porous for the matrix elements to penetrate when the prepreg is heated to curing temperature. The porous material may be the same fibrous material used to make fibrous material layer 10 or it may be some other type of porous material, such as a reticulated body of thermoplastic material. In some embodiments of the invention, the fibrous material layer 10 functions as penetrable barrier that is used to form a barrier zone that is integrated into the gas venting network and provides gas venting in the X and Y directions as well as venting in the Z direction into the other barrier zones 40 and 50.

When a gas or porous material is used as the penetrable barrier, the matrix precursor elements must remain in a non-flow state at ambient temperatures (e.g. 50° F. to 90° F.). A non-flow state is considered to be one where the viscosity of the matrix precursor elements is sufficiently high to prevent the elements from flowing into the barrier zones during the storage period at ambient temperatures or below (e.g. up to 90 days). The matrix precursor elements must be able to change to a flow state when the prepreg is heated to curing temperatures (e.g. 120° F. and above). In a flow state, the viscosity of the matrix precursor element must be low enough so that the elements flow into the barrier zone within a period of a few minutes up to an hour. The thickness of the porous or gas material is chosen such that the matrix precursor elements do not contact each other during storage and sufficient open area is present to provide gas flow between the matrix precursor elements during the initial stages of curing. The thickness of the barrier materials may be varied within a given layer of the prepreg.

When a solid penetrable barrier is used, such as a thermo-fusible material, it is not necessary that the matrix precursor elements be in a non-flow state at ambient storage temperatures. In addition, the thermo-fusible material may be thinner than the porous or gaseous barrier materials, if desired. The solid barrier prevents the matrix precursor elements from entering into the barrier zone even if the elements are in a flow state at ambient temperatures. Regardless of the flow state (i.e. viscosity) of the elements at ambient temperature, it is still necessary that the elements are in a flow state when the prepreg is heated to curing temperatures, so that flow of the elements into the barrier zones occurs when the solid barrier is melted, dissolved or otherwise removed.

With regards to matrix precursor elements 21, 22 and 31 shown in FIG. 2, exemplary orientations have the following general repeating patterns: 2-A) ROROROROROROR; 2-B) COCOCOCOCOCOCOC 2-C) MOMOMOMOMOMOM; 2-D) ROCOROCOROCOROC; 2-E) ROROCO-COROROCOC; 2-F) ROROROCOCOCOROROR; and 2-G) ROROROROCOCOCOC where O is the barrier zones or openings 41, 51 and 61. One or more of the barrier zones or openings (O) may be eliminated from the above general patterns provided that there are sufficient openings remaining through the matrix precursor elements, the central zone 15 and exterior zones 16 and 17 to allow gas to escape from the prepreg in the X, Y and Z directions during curing. For example, the following general repeating patterns are suitable: 2-*a*) RRRRRRR; 2-*b*) CCCCCCC; 2-*c*) MMMMMMM; 2-*d*) RCRCRCRCRC; 2-*e*) RCRORCROR-CRO; 2-*f*) CCORROCCORRO; and 2-*g*) RCORCOR-CORCO.

The matrix precursor elements 21, 22 and 31 may be lined up in the Z direction as shown in FIG. 2 or they may be offset in the manner shown in FIG. 1. In addition, the various repeating patterns of R, C, M and O may be varied between the matrix precursor elements 21, 22 and 31. For example, the in-line orientation of matrix precursor elements represented in FIG. 2, where elements 21, 22 and 31 are all lined up in the Z direction, may be represented as follows: 2-*i*) 21=ROCO-ROCO; 22=ROCOROCO; and 31=ROCOROCO. If the matrix precursor elements are off set in the Z direction, the orientation is represented as follows: 2-*ii*) 21=ROCOROCO; 22=OROCOROC; and 31=ROCOROCO.

Other exemplary orientations include the following: 2-1) 21=ROCOROCO; 22=ROROROR and 31=ORORORR; 2-2) 21=RORORORO; 22=OCOCOCOC and 31=ROCO-ROCO; 2-3) 21=MOMOMOMO; 22=OMOMOMOM and 31=MOMOMOMO; 2-4) 21=ROCOROCO; 22=MOMO-MOMO and 31=OCOROCOR; 2-5) 21=ROROCOCOROR; 22=COCORORCOC and 31=ROROCOCOROR; 2-6) 21=CCORROCCORR; 22=RROCCORROCC and 31=CCORROCCORR; 2-7) 21=ROROROCOCO-COROROR; 22=COCOCOROROROCOCOC; and 31=OMOMOMOMOMOMOMO 2-8) 20=RORORO-COCOCOROROR; 22=OCOCOCOROROROCOCO; and 31=MOMOMOMOMO; 2-9) 21=RRRRRRR; 22=RRRRRRR and 31=COCOCOC; 2-10) 20=CCCCCCC; 22=CCCCCCC; and 31=ROROROR; 2-11) 21=MMMMMMM; 22=MMMMMMMM; and 30=MOMOMOMO; and 2-12) 21=RCRORCRORCR; 22=RCRORCRORCR and 31=ROCOROCOROCO.

The prepreg shown in FIG. 2 may be stacked sequentially during lay up and laminate formation so that the matrix precursor elements 21 on one prepreg are located next to the matrix precursor elements 22 on other prepreg. Alternatively, the various layers of prepreg may be flipped so that the prepreg precursor elements 21 on one prepreg are located next to the matrix precursor elements 21 on the adjacent prepreg and the matrix prepreg precursor elements 22 are located next to the matrix precursor elements 22 on the adjacent prepreg. When laying up multiple layers of the prepreg shown in FIG. 2, the matrix precursor elements may be located relative to each other in a variety of orientations provided that a multi-dimensional (X, Y and Z directions) gas venting network is formed. If desired, the prepreg shown in FIG. 2 may be used to form a multiple layer prepreg that is stored for later use. Prepreg composed of two or three layers of double-ply material (FIG. 2) are preferred, with the layers being oriented in either a sequential or flipped configuration.

An example of a sequentially stacked laminate is one where prepreg having the exemplary orientation (2-2), as set forth above, are stacked so that matrix precursor elements 21 are located next to matrix precursor elements 22 in the lay up. An example of a flipped lay up configuration is one where prepreg having the exemplary orientation (2-*ii*), as set forth above, are stacked so that the matrix precursor elements 21 are located next to matrix precursor elements 21 and the matrix precursor elements 22 are located next to the matrix precursor elements 22.

If desired, the matrix resin precursors 21, 22 and 31 may be provided as two or more layers of material instead of one layer as shown in FIG. 2. For example, matrix precursor elements composed of two layers (not shown) may be represented as 21*a* and 21*b*, 22*a* and 22*b* or 31*a* and 31*b*. 21*a* is located closest to fibrous layer 11 and 22*a* is located closest to the fibrous layer 12. 31*a* is located closest to fibrous layer 11 and 31*b* is located closest to fibrous layer 12. The two layers of material that make up each matrix resin precursor element may be oriented so that the layers of matrix precursor elements are parallel to each and placed on top of each other. Alternatively, the parallel lines of matrix precursor elements may be offset relative to each other. In addition, the two layers of linear matrix precursor elements may be oriented at angles relative to each other, such as ±90°, ±45°, ±30° or ±15°.

As examples, the two layers of matrix resin precursor may be oriented as follows: 2-1D) 21*a*, 22*a* or 31*a*=RRRRRRRR and 21*b*, 22*b* or 31*b*=ROROROROR; 2-2D) 21*a*, 22*a* or 31*a*=CCCCCCCC and 21*b*, 22*b* or 31*b*=COCOCOCO; 2-3D) 21*a*, 22*a* or 31*a*=RCRCRCRCR and 21*b*, 22*b* or 31*b*=RCORCORCORC; 2-4D) 21*a*, 22*a* or 31*a*=RCRCRCRCRC and 21*b*, 22*b* or 31*b*=RCRCRCRCRC. The matrix precursor elements may be arranged so that there is one layer in the exterior zones 16 and 17 (e.g. elements 21 and 22) and two layers in the central zone 15 (e.g. two layer element 31*a*/31*b*). An example is where 21=ROCORO-CORO; 22=RCORCORCORCO; and 31*a*=ROCOROCROC and 31*b*=OCOROCROCO. Three or more layers of different materials may be used to form the matrix precursor elements used in the double-ply configuration shown in FIG. 2, however, two layers is preferred.

The barrier zones 41, 51 and 61 are formed in the same manner as described above in connection with the single-ply embodiment (FIG. 1). The penetrable barriers may also be made from a gas (preferably air or inert gas), or a thermofusible polymer or other solid barrier that melts, dissolves or is otherwise removed when the prepreg is heated during the curing process. The penetrable barrier may also be a porous material that is sufficiently porous for the matrix elements to penetrate when the prepreg is heated to curing temperature. The porous material may be the same fibrous material used to make fibrous material layers (11 or 12) or it may be some other type of porous material. In some embodiments of the invention, the fibrous material layers 11 and/or 12 function as penetrable barriers that are used to form barrier zones that are integrated into the gas venting network to provide gas venting in the X and Y directions as well as venting in the Z direction into the barrier zones 41, 51 and 61.

The matrix precursor elements may be applied to the fibrous layers as individual elements or they may be preformed into a sheet or layer of elements that is later applied to the fibrous layers during prepreg formation. The elements may be placed on a supporting layer, web or veil of material that is removed when the elements are applied to the fibrous layer. The elements may be linked together or otherwise formed into a layer of oriented elements using materials that remain in the prepreg, if desired.

An exemplary preferred sheet of matrix precursor elements is shown in FIG. 3 at 70. In this type of system, the matrix precursor elements 71 are connected or linked together by bridges of matrix precursor material 72. The matrix precursor bridges 72 span across barrier zones or openings 73. The bridge 72 is preferably made from the same matrix precursor material as the matrix precursor elements 71. However, it is possible to make the bridges 72 from a matrix precursor material that is different from the material in the adjoining matrix precursor element.

The thickness (t) of the matrix precursor bridges 72 and the particular matrix precursor material are selected so that the bridges melt or flow during curing in order to open the barrier zones as shown in phantom in FIG. 3. This provides for flow of gas in the Z direction through the barrier zones during curing. The bridged or notched configuration shown in FIG. 3 is preferred when it is desired to form a sheet of matrix precursor elements that may be applied to the fibrous layers as a single entity. The sheet of matrix precursor elements 70 may be used in place of any or all of the layers of precursor elements 20, 21, 22, 30 and 31.

Any number of different thermosetting resins may be used to form matrix precursor elements R. Exemplary thermosetting resins include epoxy resins, bismaleimides, resins of phenol formaldehyde, urea-formaldehyde, 1,3,5-triazine-2,4, 6-triamine (Melamine), vinyl ester resins, benzoxazine resins, phenolic resins, polyesters, cyanate ester resins, epoxide polymers, or any combination thereof. Epoxy resins are a preferred matrix precursor element. The matrix precursor elements R should be provided in amounts such that the prepreg contains from 20 wt % to 80 wt % thermosetting resin including thermoplastics and other resin additives.

The epoxy resins may be selected from any of the epoxy resins that are used in high performance aerospace epoxies. Difunctional, trifunctional and tetrafunctional epoxy resins may be used. Preferably, the epoxy resin component will be a combination of trifunctional and tetrafunctional epoxy compounds. The relative amounts of trifunctional and tetrafunctional epoxies may be varied. However, it is preferred that the amount of trifunctional epoxy is greater than or equal to the amount of tetrafunctional epoxy.

A trifunctional epoxy resin will be understood as having the three epoxy groups substituted either directly or indirectly in a para or meta orientation on the phenyl ring in the backbone of the compound. A tetrafunctional epoxy resin will be understood as having the four epoxy groups in the backbone of the compound. Suitable substituent groups, by way of example, include hydrogen, hydroxyl, alkyl, alkenyl, alkynyl, alkoxyl, aryl, aryloxyl, aralkyloxyl, aralkyl, halo, nitro, or cyano radicals. Suitable non-epoxy substituent groups may be bonded to the phenyl ring at the para or ortho positions, or bonded at a meta position not occupied by an epoxy group.

Suitable trifunctional epoxy resins, by way of example, include those based upon: phenol and cresol epoxy novolacs; glycidyl ethers of phenol-aldelyde adducts; aromatic epoxy resins; dialiphatic triglycidyl ethers; aliphatic polyglycidyl ethers; epoxidised olefins; brominated resins, aromatic glycidyl amines and glycidyl ethers; heterocyclic glycidyl imidines and amides; glycidyl ethers; fluorinated epoxy resins or any combination thereof. A preferred trifunctional epoxy is the triglycidyl ether of para aminophenol, which is available commercially as Araldite MY 0500 or MY 0510 from Huntsman Advanced Materials (Monthey, Switzerland).

Suitable tetrafunctional epoxy resins, by way of example, include those based upon: phenol and cresol epoxy novolacs; glycidyl ethers of phenol-aldelyde adducts; aromatic epoxy resins; dialiphatic triglycidyl ethers; aliphatic polyglycidyl ethers; epoxidised olefins; brominated resins, aromatic glycidyl amines and glycidyl ethers; heterocyclic glycidyl imidines and amides; glycidyl ethers; fluorinated epoxy resins or any combination thereof. A preferred tetrafunctional epoxy is N,N,N',N'-tetraglycidyl-m-xylenediamine, which is available commercially as Araldite MY0720 or MY0721 from Huntsman Advanced Materials (Monthey, Switzerland).

If desired, the matrix resin precursor may also include a difunctional epoxy, such a Bisphenol-A (Bis-A) or Bisphenol-F (Bis-F) epoxy resin. Exemplary Bis-A epoxy resin is available commercially as Araldite GY6010 (Huntsman Advanced Materials) or DER 331, which is available from Dow Chemical Company (Midland, Mich.). Exemplary Bis-F epoxy resin is available commercially as Araldite GY281 and GY285 (Huntsman Advanced Materials). The amount of Bis-A or Bis-F epoxy resin present in the epoxy resin component may be varied. It is preferred that no more than 20 weight percent of the matrix precursor element R be difunctional epoxy resin.

The thermosetting resin in matrix precursor element R may include one or more thermoplastics. Thermoplastics are commonly blended with epoxy resins to increase toughness. Exemplary thermoplastics include polyether sulfones, polyetherimides, polyamideimide, polyamides, copolyamides, polyimides, aramids, polyketones, polyetheretherketones, polyesters, polyurethanes, polysulphones, polyethersulfones, high performance hydrocarbon polymers, liquid crystal polymers, polytetrfluoroethylene, elastomers, and segmented elastomers. It is preferred that no more than 30 weight percent of the total thermosetting resin composition be thermoplastic.

The thermosetting resin in matrix precursor element R may also include any of the known additives that are typically included in thermosetting resin compositions. Exemplary additives include performance enhancing or modifying agents and additional thermoplastic polymers provided they do not adversely affect the tack and outlife of the prepreg or the strength and damage tolerance of the cured composite part. The performance enhancing or modifying agents, for example, may be selected from flexibilizers, toughening agents/particles, accelerators, core shell rubbers, flame retardants, wetting agents, pigments/dyes, ultraviolet absorbers, anti-fungal compounds, fillers, conducting particles, and viscosity modifiers.

Suitable fillers include, by way of example, any of the following either alone or in combination: silicas, aluminas, titania, glass, calcium carbonate and calcium oxide. Suitable conducting particles, by way of example, include any of the following either alone or in combination: silver, gold, copper, aluminum, nickel, conducting grades of carbon, buckminsterfullerene, carbon nanotubes and carbon nanofibres. Metal-coated fillers may also be used, for example nickel coated carbon particles and silver coated copper particles. The amount of fillers should be less than 30 wt % of the total thermosetting resin composition.

Fillers that are porous may be used to absorb gas during the curing process to further enhance the gas venting provided by the gas venting network. Exemplary porous fillers include both micron sized particles and nanoparticles. Exemplary materials include porous calcium carbonate, porous calcium oxide and nanotubes.

Matrix precursor elements C may include any of the curatives used to cure thermosetting resins. The particular curative and the amount of curative may be varied depending upon the particular orientation of the R and C matrix precursor elements. The amount of C matrix precursor elements in a given prepreg is chosen to insure complete curing of the thermosetting resin. This can be determined by procedures well known in the art.

Preferred matrix precursor elements C are those which facilitate the curing of the epoxy-functional compounds of the preferred epoxy resins and, particularly, facilitate the ring opening polymerization of such epoxy compounds. In a particularly preferred embodiment, such curatives include those compounds which polymerize with the epoxy-functional compound or compounds, in the ring opening polymerization thereof. Two or more such curatives may be used in combination to form the matrix precursor elements C. The curatives may be blended to form a single matrix precursor element, e.g. 20, 21, 21, 30 or 31. Alternatively, the curatives may be layered to form multi-layered matrix precursor elements, e.g. 20a/20b, 21a/21b, 22a/22b, 30a/30b or 31a/31b.

Suitable curatives include anhydrides, particularly polycarboxylic anhydrides, such as nadic anhydride (NA), methylnadic anhydride (NA—available from Aldrich), phthalic anhydride, tetrahydrophthalic anhydride, hexahydrophthalic anhydride (HHPA—available from Anhydrides and Chemicals Inc., Newark, N.J.), methyltetrahydrophthalic anhydride (MTHPA—available from Anhydrides and Chemicals Inc.), methylhexahydrophthalic anhydride (MHHPA—available from Anhydrides and Chemicals Inc.), endomethylenetetrahydrophthalic anhydride, hexachloroendomethylene-tetrahydrophthalic anhydride (Chlorendic Anhydride—available from Velsicol Chemical Corporation, Rosemont, Ill.), trimellitic anhydride, pyromellitic dianhydride, maleic anhydride (MA—available from Aldrich), succinic anhydride (SA), nonenylsuccinic anhydride, dodecenylsuccinic anhydride (DDSA—available from Anhydrides and Chemicals Inc.), polysebacic polyanhydride, and polyazelaic polyanhydride.

Further suitable curatives are the amines, including aromatic amines, e.g., 1,3-diaminobenzene, 1,4-diaminobenzene, 4,4'-diamino-diphenylmethane, and the polyaminosulphones, such as 4,4'-diaminodiphenyl sulphone (4,4'-DDS-available from Huntsman), 4-aminophenyl sulphone, and 3,3'-diaminodiphenyl sulphone (3,3'-DDS).

Also, suitable curatives may include polyols, such as ethylene glycol (EG—available from Aldrich), poly(propylene glycol), and poly(vinyl alcohol); and the phenol-formaldehyde resins, such as the phenol-formaldehyde resin having an average molecular weight of about 550-650, the p-t-butylphenol-formaldehyde resin having an average molecular weight of about 600-700, and the p-n-octylphenol-formaldehyde resin, having an average molecular weight of about 1200-1400, these being available as HRJ 2210, HRJ-2255, and SP-1068, respectively, from Schenectady Chemicals, Inc., Schenectady, N.Y.). Further as to phenol-formaldehyde resins, a combination of CTU guanamine, and phenol-formaldehyde resin having a molecular weight of 398, which is commercially available as CG-125 from Ajinomoto USA Inc. (Teaneck, N.J.), is also suitable.

Different commercially available compositions may be used as matrix precursor elements C in the present invention. One such composition is AH-154, a dicyandiamide type formulation, available from Ajinomoto USA Inc. Others which are suitable include Ancamide 400, which is a mixture of polyamide, diethyltriamine, and triethylenetetraamine, Ancamide 506, which is a mixture of amidoamine, imidazoline, and tetraethylenepentaamine, and Ancamide 1284, which is a mixture of 4,4'-methylenedianiline and 1,3-benzenediamine; these formulations are available from Pacific Anchor Chemical, Performance Chemical Division, Air Products and Chemicals, Inc., Allentown, Pa.

Additional suitable curatives include imidazole (1,3-diaza-2,4-cyclopentadiene) available from Sigma Aldrich (St. Louis, Mo.), 2-ethyl-4-methylimidazole available from Sigma Aldrich, and boron trifluoride amine complexes, such as Anchor 1170, available from Air Products & Chemicals, Inc.

Further additional suitable curatives include 3,9-bis(3-aminopropyl-2,4,8,10-tetroxaspiro[5.5]undecane, which is commercially available as ATU, from Ajinomoto USA Inc., as well as aliphatic dihydrazide, which is commercially available as Ajicure UDH, also from Ajinomoto USA Inc., and mercapto-terminated polysulphide, which is commercially available as LP540, from Morton International, Inc., Chicago, Ill.

Exemplary preferred matrix precursor elements C include 4,4'-diaminodiphenyl sulphone (4,4'-DDS) and 3,3'-diaminodiphenyl sulphone (3,3'-DDS), both commercially available from Huntsman. The matrix precursor elements C are provided so that the amount of curative in the uncured prepreg ranges from 5 wt % to 45 wt %

The matrix precursor element C may also include one or more accelerators for the thermosetting resins. Suitable accelerators for epoxy resins are any of the urone compounds that have been commonly used. Specific examples of accelerators, which may be used alone or in combination, include N,N-dimethyl, N'-3,4-dichlorphenyl urea (Diuron), N'-3-chlorophenyl urea (Monuron), and preferably N,N-(4-methyl-m-phenylene bis[N',N'-dimethylurea] (e.g. Dyhard UR500 available from Degussa). When an accelerator is present in a matrix precursor element C, the element must be separated from matrix elements R by one or more penetrable barriers in order to prevent premature curing of the prepreg.

Matrix precursor elements M are formed by blending a thermosetting resin with one or more curatives. The combination of thermosetting resin and curative is selected so that no appreciable curing takes place during storage at room temperature. Highly reactive curing agents and accelerators are not suitable for use in forming matrix precursor elements M. The relative amounts of thermosetting resin and curative may be varied depending upon the amount of other matrix precursor elements R and C that are present in the prepreg. The relative amounts of thermosetting resin and curative are chosen to insure complete curing of the prepreg while at the same time limiting any curing reactions at room temperature.

Exemplary matrix precursor elements M include combinations of thermosetting resins with amine-terminated polymer curing agents, such as 4,4'-DDS and 3,3'-DDS. More reactive curing agents and/or accelerators may be used provided that they are encapsulated with a less reactive agent, as is known in the art.

Prepreg in accordance with the present invention may be made using any of the standard prepreg preparation procedures provided that the uncured resin matrix and fibrous layers are configured in the manner shown in FIGS. 1 and 2 and as described above. The total amount of matrix precursor elements (R, C and M) should be from 20 wt % to 80 wt % of the total prepreg weight. The total weight of penetrable barrier material will vary from almost 0 wt % when the barriers are all composed of gas to about 80 wt % when thermo-fusible and/or porous barrier materials (including the fibrous layers 10, 11 or 12) are used The prepreg should be stored at temperatures that are no higher than ambient temperatures. During the curing process, the prepreg is heated to a temperature for a sufficient curing time that is appropriate for insuring complete cure of a particular resin-curative combination. For epoxy resins, the prepreg is kept at ambient temperature or below prior to being heated to curing temperatures on the order of 120° C. to 200° C. for cure times on the order of 1 to 2 hours or more. Any of the typical curing systems may be used including autoclaving, vacuum molding and press molding. The storage temperatures and curing parameters for other thermosetting resin systems are well known and prepreg of the present invention that incorporate such matrix precursor elements may be stored and cured in the same manner as the conventional prepreg.

Having thus described exemplary embodiments of the present invention, it should be noted by those skilled in the art that the within disclosures are exemplary only and that various other alternatives, adaptations and modifications may be made within the scope of the present invention. Accordingly, the present invention is not limited by the above-described embodiments, but is only limited by the following claims.

What is claimed is:

1. A method for making a composite part comprising the steps of:
   providing a fibrous element comprising a first side and a second side;
   applying a sheet of resin as a single entity to the first side of said fibrous element, said sheet of resin comprising a flat side and a notched side, said flat side being located on the first side of said fibrous element and said notched side having alternating upper resin surfaces and lower resin surfaces; said sheet of resin comprising a plurality of resin elements consisting of parallel lines of one or more thermosetting resins that are separated from each other by a resin barrier zone comprising a penetrable barrier material wherein said resin elements extend between the flat side of said sheet of resin and the upper resin surfaces, said sheet of resin further comprising resin bridges which extend across said resin barrier zones at the flat side of said sheet of resin to form partially closed resin hairier zones that are partially filled with said penetrable barrier material, said resin bridges providing connections between said resin elements along the flat side of said sheet of resin, said resin bridges consisting of one or more thermosetting resins and each of said resin bridges having a thickness extending between the flat side of said sheet of resin and one of said lower resin surfaces;
   applying one or more curative elements consisting of one or more curatives for said one or more thermosetting resins to said fibrous element, said curative elements being located on the second side of said fibrous element; and
   curing said sheet of resin to form said composite part wherein said thickness of said resin bridges is such that said resin bridges flow during curing into said fibrous element in order to open the partially closed resin barrier zones to form a gas venting network which provides multi-dimensional escape of gas during curing of said sheet of resin.

2. A method for making a composite part according to claim 1, wherein said step of applying one or more curative elements to fibrous element comprises applying a sheet of curative as a single entity, said sheet of curative comprising a flat side and a notched side, said flat side being located on the second side of said fibrous element and said notched side having alternating upper curative surfaces and lower curative surfaces; said sheet of curative comprising a plurality of curative elements consisting of parallel lines of one or more curatives for said thermosetting resins that are separated from each other by a curative barrier zone comprising a penetrable barrier material wherein said curative elements extend between the flat side of said sheet of curative and the upper curative surfaces, said sheet of curative further comprising curative bridges which extend across said curative barrier zones at the flat side of said sheet of curative to form partially closed curative barrier zones that are partially filled with said penetrable barrier material, said curative bridges providing connections between said curative elements along the flat side of said sheet of curative, said curative bridges consisting of one or more curatives for said thermosetting resins and each of said curative bridges having a thickness extending between the flat side of said sheet of curative and one of said lower curative surfaces, wherein said thickness of said curative bridges is such that said curative bridges flow during curing into said fibrous element in order to open the partially closed resin barrier zones to form a gas venting network which provides multi-dimensional escape of gas during curing of said sheet of resin.

3. A method for making a composite part according to claim 1 wherein said resin elements that are located on the first side of said fibrous element are transversely offset from the curative elements that are located on the second side of said fibrous element.

4. A method for making a composite part according to claim 2 wherein said resin elements that are located on the first side of said fibrous element are transversely offset from the curative elements that are located on the second side of said fibrous element.

5. A method for making a composite part according to claim 1 wherein said resin elements consist of one or more epoxy resins.

6. A method for making a composite part according to claim 1 wherein resin elements consisting of parallel lines of one or more thermosetting resins are also located on the second side of said fibrous element.

7. A method for making a prepreg according to claim 1 wherein curative elements consisting of parallel lines of one or more curatives are also located on the first side of said fibrous element.

8. A method for making a composite part according to claim 1 wherein the penetrable barrier material in said resin barrier zone comprises a material selected from the group consisting of gas, thermo-fusible polymers and porous materials.

9. A method for making a composite part according to claim 8 wherein the penetrable barrier material in said resin barrier zone comprises a gas.

10. A method for making a composite part according to claim 2 wherein the penetrable barrier material in said curative barrier zone comprises a material selected from the group consisting of gas, thermo-fusible polymers and porous materials.

11. A method for making a composite part according to claim 10 wherein the penetrable barrier material in said curative barrier zone comprises a gas.

* * * * *